(12) United States Patent
McClure et al.

(10) Patent No.: US 8,051,636 B2
(45) Date of Patent: Nov. 8, 2011

(54) PICK-UP REEL TINE MOUNTING

(75) Inventors: John R. McClure, New Holland, PA (US); Lee S. Curley, Gap, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/725,484

(22) Filed: Mar. 17, 2010

(65) Prior Publication Data
US 2011/0225942 A1 Sep. 22, 2011

(51) Int. Cl.
*A01D 89/00* (2006.01)
(52) U.S. Cl. .................. 56/364; 56/400; 56/400.21
(58) Field of Classification Search .............. 56/14.3, 56/14.4, 16.1, 17.3, 364, 400, 400.21; 172/643, 172/707
See application file for complete search history.

(56) References Cited

U.S. PATENT DOCUMENTS

| | | | | |
|---|---|---|---|---|
| 322,351 A | | 7/1885 | Cook | |
| 707,624 A | * | 8/1902 | Niles | 403/213 |
| 1,063,508 A | * | 6/1913 | Cluett | 403/93 |
| 2,432,653 A | | 12/1947 | Bloom | |
| 2,704,150 A | * | 3/1955 | Scranton | 198/692 |
| 2,714,796 A | | 8/1955 | Haupt et al. | |
| 2,790,538 A | * | 4/1957 | Collins et al. | 198/692 |
| 2,957,299 A | * | 10/1960 | Gustafson et al. | 56/400 |
| 3,014,335 A | | 12/1961 | Nolt | |
| 3,102,377 A | | 9/1963 | Garrett | |
| 3,171,243 A | * | 3/1965 | Johnston | 56/400 |
| 3,192,696 A | * | 7/1965 | Hurry | 56/400 |
| 3,226,922 A | * | 1/1966 | Luther et al. | 56/400 |
| 3,531,927 A | * | 10/1970 | Wood | 56/400 |
| 3,548,580 A | * | 12/1970 | Krauss et al. | 56/400 |
| 4,304,306 A | | 12/1981 | Maust, Jr. et al. | |
| 4,403,469 A | | 9/1983 | Hofer | |
| 4,437,296 A | | 3/1984 | Erdman | |
| 4,545,188 A | * | 10/1985 | Klinner | 56/364 |
| 4,589,497 A | * | 5/1986 | Kovar | 172/707 |
| 5,394,682 A | * | 3/1995 | Frimml et al. | 56/341 |
| 6,324,823 B1 | | 12/2001 | Remillard | |
| 6,397,573 B2 | | 6/2002 | Majkrzak | |
| 6,907,720 B2 | | 6/2005 | Schumacher et al. | |
| 7,124,564 B2 | | 10/2006 | Glazik et al. | |

\* cited by examiner

*Primary Examiner* — Thomas Will
*Assistant Examiner* — Mai Nguyen
(74) *Attorney, Agent, or Firm* — Patrick M. Sheldrake; Michael G. Harms

(57) ABSTRACT

A tine connection device for removably connecting a tine to an elongate tine bar in an agricultural harvesting machine wherein the device comprises a mounting base that is contoured to simultaneously engage the tine bar and a mounting portion of the tine and in combination with a contoured clamp fastener, restrain the mounting portion of the tine in a predetermined position relative to the tine bar. The mounting base and clamp fastener further enable a plurality of tines to be easily and uniformly connected to a tine bar while the specific contours of the mounting base and clamp fastener in adjacent contact with the tine serve to reduce stress concentrations thereby promoting extended tine service life.

19 Claims, 3 Drawing Sheets

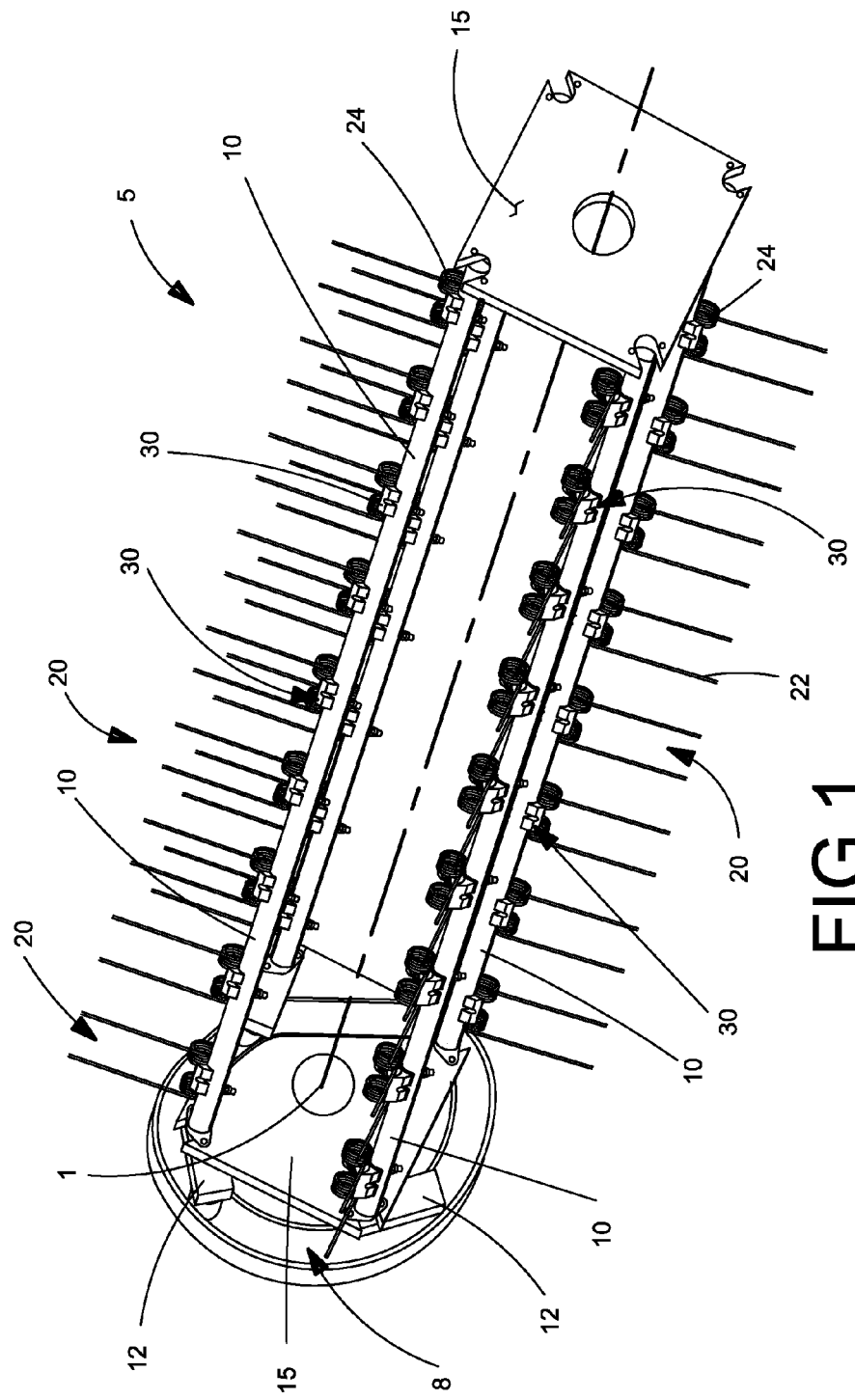

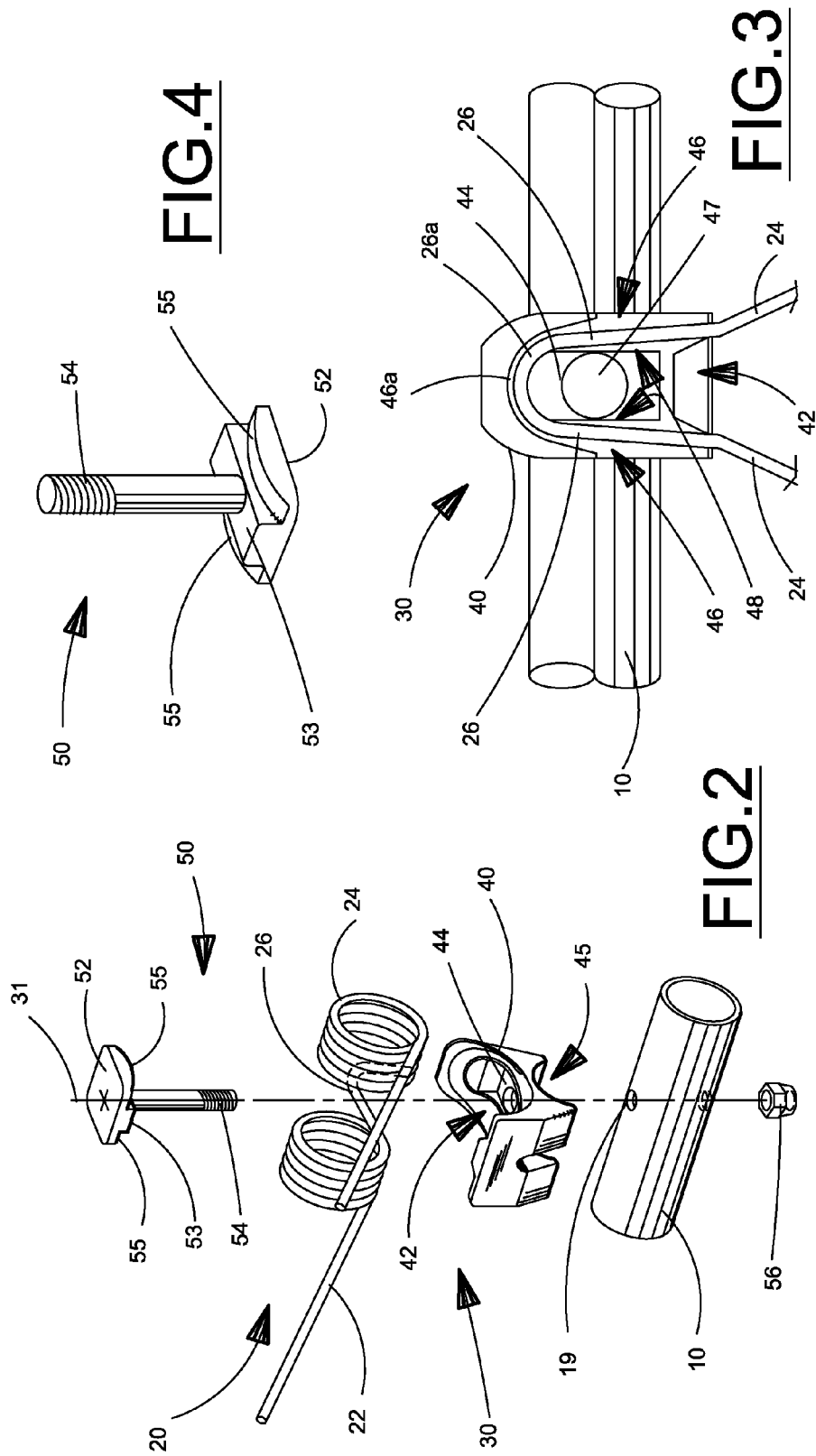

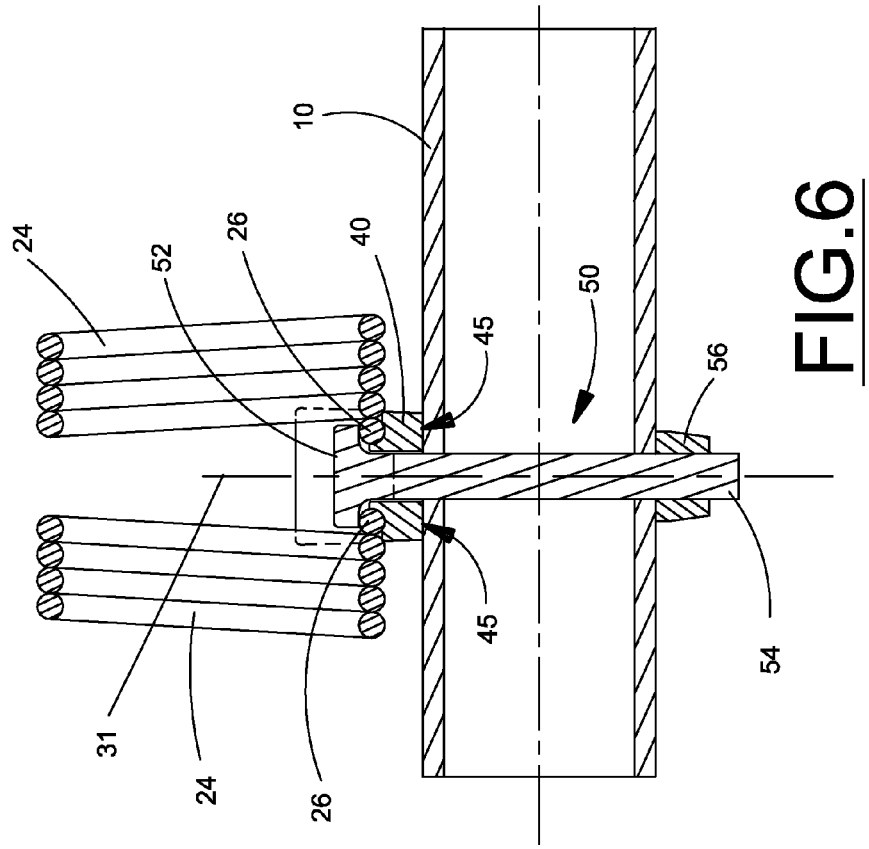
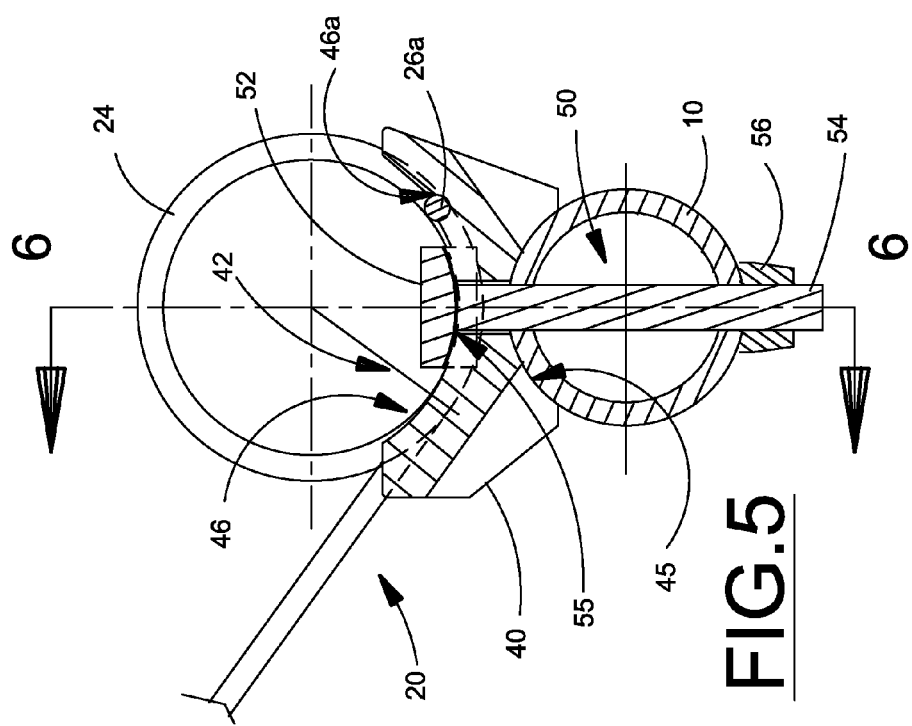

PICK-UP REEL TINE MOUNTING

BACKGROUND OF THE INVENTION

This invention relates generally to agricultural machines having a rotatable pick-up reel for lifting crop from the ground into the machine, and, more particularly, to an improved device for connecting individual tines to rotating bars of the pick-up reel.

Pick-up reels used in agricultural machine comprise a plurality of parallel tine bars arranged in a cylindrical pattern which is rotated about a central axis. Individual tines are connected to the bars and extend generally outwardly to engage the crop material. The tine bars may be individually rotated dependent upon the reel rotational position vary the position of the tines relative to the reel rotational position, such as for folding the tines inwardly at a point in the rotation to release the crop material for feed into the machine. Tines are typically connected to the tine bars using a variety of bolts, clips, or cast mounts, all of which increase the total part count of the reel and hence, increase production costs. On reels used in agricultural balers, the connection of the tine to the tine bar is subjected to higher loadings compared to reels used to urge a standing crop into a cutterbar. In baler applications, the tines are required to engage and lift crop material from a windrow on the ground and raise the material to a height at which it can be fed into the baler. These increased tine loads require more robust tine mounts connecting tines to tine bars.

One particular tine mount used by common assignee to this application comprises a bolt, clip, and casting to connect tines to the tine bars. The casting is necessary to provide a sufficient contact area between the tine and the tine bar to adequately distribute stresses. Aside from a high part count for reels using this connection assembly, these mounts have demonstrated a tendency to erode the tine at the clip interface leading to premature tine failures.

It would be advantageous to have an improved mounting device for attaching a tine to a tine bar in a pick-up reel that provides a suitably robust connection, reduces the part count compared to known devices, and reduces the risk of erosion or fretting of the tine by the tine mount device during operation.

SUMMARY OF THE INVENTION

Accordingly, the present invention, in any of the embodiments described herein, may provide one or more of the following advantages:

It is an object of the present invention to provide a mounting device for connecting a tine to a pick-up reel comprising fewer parts than the known device it replaces.

It is a further object of the present invention to provide a mounting device for connecting a tine to a pick-up reel that reduces tine wear at the tine mounting interface during operation of the pick-up reel.

It is a further object of the present invention to provide a mounting device for connecting a tine to a pick-up that is suitably robust for application in an agricultural baler pick-up reel.

It is a further object of the present invention to provide a mounting device for connecting a tine to a pick-up reel that simplifies pick-up reel assembly.

It is a still further object of the present invention to provide a mounting device for connecting a tine to a pick-up reel that maintains the tine orientation sufficiently fixed in relation to the tine bar for proper pick-up reel operation.

It is a still further object of the present invention to provide a mounting device for connecting a tine to a pick-up reel that is compatible with current production tine and tine bar configurations used in agricultural balers and other agricultural equipment using pick-up reels.

It is a still further object of the present invention to provide an improved mounting device for connecting a tine to a tine bar in a pick-up reel that is durable in construction, inexpensive of manufacture, carefree of maintenance, easily assembled, and simple and effective to use.

These and other objects are achieved in accordance with the instant invention by providing a tine connection device for removably connecting a tine to an elongate tine bar in an agricultural harvesting machine wherein the device comprises a mounting base that is contoured to simultaneously engage the tine bar and a mounting portion of the tine and in combination with a contoured clamp fastener, restrain the mounting portion of the tine in a predetermined position relative to the tine bar. The mounting base and clamp fastener further enable a plurality of tines to be easily and uniformly connected to a tine bar while the specific contours of the mounting base and clamp fastener in adjacent contact with the tine serve to reduce stress concentrations thereby promoting extended tine service life.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a partial perspective view of a reel assembly used in an agricultural harvester of the type on which the present invention is useful;

FIG. 2 is an exploded view showing the individual elements of one embodiment of the present invention for securing a tine to the tine bar;

FIG. 3 is a partial plan view of one embodiment of the tine connector base of the present invention;

FIG. 4 is a detail view of the clamping fastener used in the tine mounting device of the present invention;

FIG. 5 is a cross-section view of the tine mounting device shown in FIG. 2; and FIG. 6 is a section view of the tine mounting device of FIG. 5 taken along cut line 6-6.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIG. 1, a reel 5 of the type commonly used in agricultural harvesters is shown comprising a plurality of tine bars 10 that are radially distanced from a central rotational axis 1 and distributed around a rotational circumference of the reel 5. Reels featuring three to six tine bars are common, though reels having greater numbers of tine bars are possible. The tine bars 10 are supported by a pair of opposing end caps 15 which fix the radial and lateral position of the tine bars relative to the rotational axis 1. End caps 15 also enable the reel 5 to be rotatably connected to the harvester structure and provide a convenient structure for receiving rotational power from the prime mover to rotate the reel. To each tine bar 10 is attached a plurality of tines 20 which extend generally outwardly from the reel circumference defined by the rotational path of the tine bars 10. The tines 20 are generally made from a spring steel wire having a generally circular cross-sectional profile. The spring properties of the tines are further realized by a coil spring portion 22 disposed between a mounting loop 26 and one or more tine fingers 22. Tines 20 are connected to tine bars 10 by a plurality of tine connectors 30 which engage the mounting loops 26 of the tines and secure them to the tine bars 10.

Depending upon the width of the machine on which the reel is used, the reel 5 and consequently the tine bars 10 may be very long, as much as six to nine meters or more. Intermediate supports may be used to maintain the proper spatial relationship of the tine bars on longer reels. Also depending upon the specific application, tine spacing on the order of one tine 20 every five to twelve inches along the tine bar length is common. On a 6 meter reel having six tine bars and 6 inch tine spacing, over 200 tines would be necessary, illustrating the necessity of a simple, low part count connection means between the tines 20 and the tine bars 10. To this end, a tine typically comprises two tine fingers 22 extending from a single connection loop 26 (shown in FIGS. 2 and 3). In a preferred embodiment, each tine 20 is formed from a continuous length of a rod-like material wherein the ends terminate at the ends of fingers 22, and a pair of spring coil portions 24 are formed near the mid-point of the material with a U-shaped connector portion 26 disposed between the spring coil portions 24. The spring coil portions 24 are wound about a common axis such that the coils are aligned in generally parallel planes.

The tine bars 10 may also include followers 12 at one or both ends which engage a cam 8 in order to rotate the tine bars about their longitudinal axes as the reel rotates thereby altering the angular extension of the tines 20 during rotation of the reel 5. Such features are generally included on machines in which the tines must be repositioned in order to aid in crop handling or to clear portions of the machine at some point on the tine path. In a typical baler application, the tines are ideally fully extended (substantially radially) in the portion of the rotation adjacent to the ground and angled toward a more tangential orientation in the portion of the reel rotation at which crop material is to be released from the reel.

Now referring to FIGS. 2, 3, and 4, FIG. 2 presents an exploded view of one embodiment of the tine connector 30 of the present invention, FIG. 3 shows a top view of the tine connector 30 assembly and FIG. 4 details clamp fastener 50. Tine connector 30 comprises a connector base 40 and a clamp fastener 50. Connector base 40 includes an arcuately shaped saddle 45 portion configured to conform to the outer surface of the tine bar 10 sufficiently to prevent the connector base 40 from rotating about the clamp axis 31 of the clamp fastener 50 when the base 40 is assembled in contact with the tine bar 10. Moreover, the through-bolt style connection also precludes rotation of the connector base 40 about the tine bar 10, thus ensuring a generally rigid connection between tine 20 and tine bar 10. While tine bars 10 having circular cross-sections are presented herein, a skilled artisan will recognize that tine bars having other cross sections, such as polygonal cross sections, offer the same functionality provided the saddle 45 portions are configured to match the cross section profile of the particular tine bars. Such variations are anticipated and considered within the scope and spirit of this invention.

The tine engaging surface 42 of connector base 40 is disposed generally opposite of the saddle 45 and includes a groove-like receptacle 46 for receiving a portion of the tine 20, including at least a mounting loop 26. Mounting loop 26 is generally U-shaped and includes a portion of the innermost coils of the two conventional coil spring portions 24 that make up the preferred tine configuration. The contour of receptacle 46 is configured to match the contour of the tine mounting loop 26 so that the mounting loop 26 will substantially contact the receptacle and uniformly distribute contact stresses between the tine mounting loop 26 and the base 40. The receptacle 46 is also configured to engage the mounting loop 26 in a manner positions the tine 10, inhibits rotation of the tine 20 in the connector base 40 about an axis parallel to the tine bar 10, and inhibits lateral displacement in the direction of the tine bar 10 axis, thus maintaining the tine 20 in a pre-determined position relative to the connector base 40. A fastener aperture 47 is provided to receive the clamp fastener 50 which in turn allows the tine 20 and connector base 40 to be connected to the tine bar 10. Tine engaging surface 42 also includes a connector recess 44 having a pair of opposing walls 48 configured to engage a portion of a clamp fastener 50 in a torque-resistant manner. A plurality of holes 19 provided in the tine bar 10 each receive a clamp fasteners 40 and enable a nut 56 to secure the clamp fastener 40 in position.

The clamp fastener 50 is configured to interface with the engaging surface 42 of connector base 40 in a manner to restrain tine 20 in a predetermined position without creating stress concentration sites that could increase the likelihood of tine failures. Clamp fastener 50 thus comprises an elongate extension 54 having a head 52 at one end. Head 52 features a clamp surface 55 that is shaped to closely conform to the arcuate contour of receptacle 46 and the coil radius of the coil spring portion 24 and mounting loop 26. In the preferred embodiment, clamp surface 55 and receptacle 46 are curved to match the curvature of the tine mounting loop 26. Mounting loop 26 may be a straight tangential extension of the coil of the coil spring portion 24, or may be a continuation of the curvature of coil of spring portion 24. In a preferred embodiment, a pair of tines 20 is interconnected by the mounting loop 26 to form a two-tine part that can be secured by a single tine connector 30. In this embodiment, the clamp surface 55 engages the inner-most coil of the coil spring portion 24 which functions as the mounting loop 26. The U-shaped portion of the preferred mounting loop 26a engages a corresponding end 46a of receptacle 46 to provide tine positional location in both lateral and longitudinal directions (relative to the machine travel direction). Clamp fastener 50 further includes a locking shoulder 53 which protrudes from the clamp surface 55 in the direction of the shank extension 54 and is able to engage the contour recess 44 so that the shoulder 53 is restrained by the walls 48 of the recess 44 to prevent rotation of the clamp fastener about clamp axis 31. The interaction of the contour recess 44 and the shoulder 53 enable the clamp fastener 50 to be connected to the tine bar 10 using a threaded nut 56 engaging the distal end of shank extension 54 in a conventional manner, yet the interaction between the connector base 40 and the tine bar 10 with rotation of the clamp fastener restrained by the connector base 40 allows tightening of the tine fastener 30 to the tine bar 10 using only a wrench engaging the nut 56. No separate, outside restraint of clamp fastener 50 is necessary.

FIGS. 5 and 6 offer additional views of the tine connector 30 showing the interface between the connector base 40, clamp fastener 50, and tine 20. In FIG. 5, the generally parallel arcuate contours of the clamp surface 55, the mounting loop 26, and the receptacle 46 are configured so that the clamping pressure on tine 20 is generally evenly distributed over clamp surface 55 thereby minimizing the chances of creating stress intensification areas in the tine material (wire). The groove-like contour of receptacle also engages the wire of the tine 20 in a manner to prevent movement in both the lateral (parallel to the tine bar axis) and longitudinal (perpendicular to the tine bar axis) directions. Clamp fastener 50 ensures that the tine 20 cannot be vertically displaced from the connector base 40 and tine bar 10 when fully connected to the tine bar 10. It is the integration of the clamp surface 55 with the clamp fastener 50 which allows the single part to fulfill the function previously requiring a clamping adapter to provide the clamping surface and a separate bolt or equivalent to connect the parts and provide the needed clamping force, thereby reducing the part count and improving reel assembly convenience.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A device for removably attaching a tine to a tine bar in a reel used on an agricultural machine comprising a tine bar having a plurality of through holes for receiving the device, the device comprising:
   a connector base having a first surface and a second surface, said first surface shaped to match the tine bar exterior for mounting the connector base to the tine bar, the second surface being generally opposed to said first surface and having a receptacle shaped to receive a portion of the tine;
   an aperture in said connector base extending from said first surface to said second surface; and
   an elongate connector having opposing first and second ends, said first end having a head with at least one clamping surface for contact with the tine and a retention shoulder that protrudes further from the head than the at least one clamping surface and is shaped to seat within a retention structure within the second surface of the connector base to prevent rotation of said connector, said second end spaced apart from said first end by a shank that extends through said aperture, the tine bar, and the tine;
   and a locking member engaging the shank near the second end, whereby the tine is connected to the tine bar.

2. The device of claim 1, wherein said receptacle is configured to receive the tine in a single predetermined orientation, and wherein said clamping surface engages the tine to restrain the tine in said single predetermined orientation.

3. The device of claim 2, further comprising a tine having a mounting portion and a finger portion, said mounting portion configured to be received by said receptacle and restrained in said receptacle by said clamping surface.

4. The device of claim 3, wherein said retention structure is a recess adjacent to said aperture and said shoulder structure is shaped and configured to extend past the second surface contacting the tine such that the shoulder is restrained by walls of the recess to prevent rotation of the clamp fastener.

5. The device of claim 4, wherein said shoulder is generally symmetrically aligned on said shank.

6. The device of claim 4, further comprising a tine having a mounting portion, said mounting portion having first and second spring coil portions continuously connected to a loop portion, said first and second spring coil portions being generally circularly wound about a generally common axis and spaced apart by said loop portion and wherein a portion of the clamping surface and the receptacle are curved to match the corresponding curvature of the tine.

7. The device of claim 6, wherein a corresponding shaped groove in the receptacle is shaped to engage the loop portion to provide a tine positional location for the single predetermined orientation in both lateral and longitudinal directions.

8. The device of claim 6, wherein said at least one clamping surface is configured to simultaneously engage said first and said second spring coil portions and retain said first and said second spring coil portions and the loop portion connecting the coil portions engages a corresponding end of the receptacle to provide tine positional location in both lateral and longitudinal directions.

9. The device of claim 6, wherein the at least one clamping surface is shaped to closely conform to an arcuate contour of the receptacle and a coil radius of the coil spring portion and the loop portion.

10. The device of claim 6, in combination with a baler having a pick-up reel for elevating crop material from the ground and feeding the crop material into said baler, said pick-up reel having a plurality of tines each connected thereto by said device.

11. A device for removably attaching a tine to a tine bar in a reel used on an agricultural machine comprising:
   an elongate tine bar arranged along an axis, said tine bar having a cross-section profile and a plurality of through holes spaced apart along said axis and oriented generally perpendicular to said axis;
   a tine having a mounting portion;
   a connector base having a first surface and a second surface, said first surface shaped to match said tine bar cross-section profile for mounting the connector base to the tine bar, said second surface being generally opposed to said first surface and having a receptacle shaped to receive said tine mounting portion;
   an aperture in said connector base extending from said first surface to a recess in said second surface; and;
   an elongate connector having opposing first and second ends, said first end having a head with at least one clamping surface for contact with the tine and a shoulder that protrudes further from the head than the at least one clamping surface to engage said recess such that the shoulder is restrained by walls of the recess to prevent rotation of the connector once inserted therein, said second end spaced apart from said first end by a shank that extends through said aperture, the tine bar, and the tine;
   and a locking member engaging the shank near the second end, whereby the tine is connected to the tine bar.

12. The device of claim 11, wherein said receptacle is configured to receive the tine in a single predetermined orientation, and wherein said clamping surface engages the tine to restrain the tine in said single predetermined orientation.

13. The device of claim 12, wherein said second surface further comprises a retention structure adjacent to said aperture to receive the shoulder in a manner to prevent rotation of said connector.

14. The device of claim 13, wherein said shoulder is generally symmetrically aligned on said shank.

15. The device of claim 13, wherein said mounting portion further comprises first and second spring coil portions continuously connected to a loop portion, said first and second spring coil portions being generally circularly wound about a generally common axis and spaced apart by said loop portion and wherein a portion of the clamping surface and the receptacle are curved to match the corresponding curvature of the tine.

16. The device of claim 15, wherein a corresponding shaped groove in the receptacle is shaped to engage the loop portion to provide a tine positional location for the single predetermined orientation in both lateral and longitudinal directions.

17. The device of claim 15, wherein said at least one clamping surface is configured to simultaneously engage said first and said second spring coil portions and retain said first and said second spring coil portions in contact with said receptacle and the loop portion connecting the coil portions engages a corresponding end of the receptacle to provide tine positional location in both lateral and longitudinal directions.

18. The device of claim 13, wherein the clamping surface and a groove of the receptacle have parallel arcuate contours configured such that clamping pressure applied to the tine is generally evenly distributed over the clamping surface.

19. The device of claim 15, in combination with a baler having a pick-up reel for elevating crop material from the ground and feeding the crop material into said baler, said pick-up reel having a plurality of tines each connected thereto by said device.

* * * * *